(12) United States Patent
Olin et al.

(10) Patent No.: US 7,178,409 B2
(45) Date of Patent: Feb. 20, 2007

(54) LAMINAR FLOW METER OR CONTROLLER

(75) Inventors: John George Olin, Carmel Valley, CA (US); John Paul Smitherman, Salinas, CA (US)

(73) Assignee: Sierra Instruments, Inc., Monterey, CA (US)

( * ) Notice: Subject to any disclaimer, the term of this patent is extended or adjusted under 35 U.S.C. 154(b) by 0 days.

(21) Appl. No.: 10/973,667

(22) Filed: Oct. 25, 2004

(65) Prior Publication Data

US 2006/0086194 A1 Apr. 27, 2006

(51) Int. Cl.
*G01F 1/37* (2006.01)
*G01F 5/00* (2006.01)
(52) U.S. Cl. ............ 73/861.52; 73/202.5; 73/202
(58) Field of Classification Search ............ 73/861.52, 73/861.42, 202.5
See application file for complete search history.

(56) References Cited

U.S. PATENT DOCUMENTS 4,487,062 A 12/1984 Olin et al.
4,800,754 A 1/1989 Korpi
5,672,821 A * 9/1997 Suzuki ............... 73/202
6,247,495 B1 * 6/2001 Yamamoto et al. .... 137/599.13

OTHER PUBLICATIONS

Bejan, A., *Convection Heat Transfer*, 1995 John Wiley & Sons, Inc., pp. 90-107.
Brower, W., *A Primer in Fluid Mechanics*, 1999 CRC Press LLC, pp. 130-334.
Dieball, A., "Mass Flow Controllers Enter the Mainstream," *Sensors Magazine*, Aug. 1, 2000, pp. 14-21.
Spitzer, D., *Flow Measurement*, 1991 Instrument Society of America, Chapter 8, pp. 115-173.
Webster, J., *Mechanical Variables Measurement*, 2000 CRC Press LLC, Chapter 9.9, pp. 99-118.

* cited by examiner

*Primary Examiner*—Harshad Patel
(74) *Attorney, Agent, or Firm*—Frank P. Becking (57) ABSTRACT

Volumetric flow meters, volumetric flow controllers, mass flow meters, and mass flow controllers using a transverse laminar flow assembly are described. The flow assembly may be constructed from a plurality of open and/or closed slices or layers stacked upon one another and held together in compression by through bolts or another means. Meter or flow controller accuracy may be aided by use of flow conditioning features preceding an axial bore of the transverse flow assembly including one or more of a deflector, filter and nozzle.

24 Claims, 9 Drawing Sheets

LAMINAR FLOW METER OR CONTROLLER

FIELD OF THE INVENTION

This invention relates to volumetric flow meters, volumetric flow controllers, mass flow meters, and mass flow controllers (hereinafter collectively, "instruments") using a laminar flow assembly, particularly regarding their decreased cost of manufacture and increased accuracy.

BACKGROUND OF THE INVENTION

One class of flow meter and flow controller employs a body configured to provide for laminar fluid flow therethrough. Flowing fluid from a conduit system enters the inlet process connection of the meter flow body, passes through a laminar flow assembly, exits through an outlet process connection of the flow body, and continues its flow within the conduit system. In passing through the laminar flow assembly, the fluid creates a pressure drop, $P_1-P_2$, between an inlet pressure port and the outlet pressure port arranged on opposite sides of the laminar flow assembly that is sensed by a differential pressure sensor. Volumetric flow meters based upon the laminar flow principle are described in Spitzer, D. W., "Flow Measurement," Instrument Society of America, Research Triangle Park, N.C., 1991, Chapter 8.

In the case wherein the laminar flow sensor is to be a mass flow sensor, the flowing fluid in the conduit system enters the inlet process connection of the flow body, and most of the total mass flow rate passes through the laminar flow assembly, exits through the outlet process connection, and flows back into the conduit. The flow through the laminar flow assembly is typically the majority fraction, $M_1$, of the total mass flow rate, M.

In passing through the laminar flow assembly, the fluid creates a pressure drop, $P_2-P_1$, between the inlet pressure port ($P_1$) and the outlet pressure port ($P_2$) which forces a (typically) minority fraction, $M_2$, of the total mass flow rate to enter the inlet pressure port, pass through a capillary tube in a mass flow sensor, and exit the outlet pressure port. As might be expected, in the case of the previously described volumetric flow meter, there is no such flow entering or exiting the inlet or outlet pressure ports, respectively.

In a mass flow meter where the flow of the fluid passing through the capillary tube and the laminar flow assembly are both nearly purely laminar and of substantially the same temperature, then the ratio, $M_1/M_2$, of the mass flow rate through the laminar flow assembly to the mass flow rate measured by the mass flow sensor is a constant, which is independent of flow rate and any fluid properties the following holds: $M=M_1+M_2=M_2 (1+M_1/M_2)=\text{Constant}\times M_2$. Thus, the measurement of the mass flow rate, $M_2$, through the sensor delivers a measurement of the total mass flow rate, M, through the flow body. Such capillary thermal mass flow sensors are more fully described in U.S. Pat. Nos. 4,487,062 and 4,800,754 and in Dieball, A., "Mass Flow Controllers Enter the Mainstream," Sensors Magazine, August, 2000, pp. 14–21.

The mass flow sensor for said instruments may comprise upstream and downstream and upstream resistance temperature detector (RTD) type sensors. Other suitable types of thermal sensors include micro-thermal mass flow sensors based on thermal resistive, thermal electric, thermal electronic, pyroelectric or frequency analog transducing principles as described in Webster, John G., Mechanical Variables Measurement, CRC Press, Boca Raton, 2000, Chapter 9.9.

As alluded to above, a laminar flow sensor body can alternatively be used as a volumetric flow meter or can become a mass flow meter adding absolute pressure and absolute temperature sensors within the flow body to compute the fluid density p (e.g., in units of kilograms per cubic meter), which when multiplied by the volumetric flow rate, Q, yields the total mass flow rate, M (i.e., $M=\rho Q$). Furthermore, the volumetric flow meter and mass flow meters may be configured as volumetric or mass flow controllers, respectively, when an integral flow control valve is supplied to the flow body.

However configured, laminar flow assemblies include one or more flow channels with dimensions sufficiently small that the passage of the fluid through them is laminar. Usually, the laminar flow assembly has either a transverse-flow geometry or an axial-flow geometry. One known laminar flow assembly with a transverse-flow geometry includes a plurality of annular disks fabricated of thin metal sheet stock compressively stacked together. Each such disk has one or more generally radially directed laminar flow channels chemically etched, or otherwise etched or fabricated, into one facet of the disk, about half way through the thickness of the disk. A second known transverse flow laminar flow assembly has its open disks fabricated of thin metal sheet stock stacked together, wherein the flow enters a relatively large entry channel on one side of every open disk; passes through a multiplicity of chemically etched, or otherwise etched or fabricated, small substantially rectangular laminar flow channels on one of the facets of each disk, all of which are rectilinearly directed (as opposed to radially directed) through the central portion of each open disk; and exits a relatively large exit channel on the opposite side of every open disk. In another version of the above second known transverse laminar flow assembly, disks between each said open disk act as gates which direct the flow in a serpentine-like pattern through the laminar flow assembly stack. If chemically etched, the laminar flow channels of the two above laminar flow assemblies have a substantially rectangular cross section, but with radii at their two bottom corners. Other known laminar flow assemblies with a transverse-flow geometry have alternative configurations designed to provide transverse flow paths through laminar flow channels of various shapes.

Known laminar flow assemblies with an axial flow geometry typically have a plug-like port blocking the entire flow body bore of the instrument in which one or more laminar flow channels direct their flow generally parallel to the axis of the flow body bore. Known laminar-flow-channel configurations of this type include one or more: porous plugs, usually consisting of sintered metallic particles; capillary tubes with small internal diameters; machined holes or grooves; or spaced plates stacked parallel to the flow body's axis.

When compared with those with laminar flow assemblies having an axial-flow geometry, those with a transverse-flow geometry offer advantages including: compactness; ease of fabricating assemblies accommodating different total flow rates; and less dependence on flow disturbances or non-uniformities upstream of the laminar flow assembly. Accordingly, there continues to be a particular interest in developing improved transverse-flow laminar flow assemblies for use in flow meters and controllers.

SUMMARY OF THE INVENTION

Aspects of the invention are applicable to flow meters and controllers as referenced above. The cost and accuracy attributed to a given design are, naturally, of importance to users of the instruments. The present invention offers advantages in each of these areas as well as others noted above common to transverse-type laminar flow assemblies.

Mass flow meters and mass flow controllers of the invention offer a total assembly time reduced by 10% to 25% as compared to any other know transverse-type laminar flow meter or controller, thereby resulting in a cost reduction in their manufacture. Additionally, devices according to the present invention offer an intrinsic linearity in performance, from zero to full-scale flow, without the use of linearizing signal conditioning, that is better than that of many known mass flow meters and mass flow controllers.

Aspects of the invention offer one or more of (1) more reproducible laminar flow assembly—providing benefits of reduced cost and increased accuracy; (2) more independence of flow disturbances upstream of the flow body—yielding benefits of increased accuracy and application of the instruments; (3) more uniform flow entering the laminar flow assembly—providing benefits of increased accuracy; and (4) reduced dynamic pressure ($\rho Q^2$) effects—providing the benefit of increased accuracy.

Both to assist in understanding the basis for these assertions as well as the advantages provided by these improvements, reference is made to the work of Bejan, Adrian, "Convection Heat Transfer," John Wiley & Sons, Inc., New York, 1984, pages 90–107, that presents the principle of operation of laminar flow assemblies with one or more transverse rectangular flow channels. Based on this reference, with some rearrangement of terms, the volumetric flow rate $Q_i$ through a single rectangular channel is expressed as follows:

$$Q_i = [a^3 b/(1+a^2/b^2)][\Delta P_{Lam}/(12 \mu L)] \quad (1)$$

In Equation (1), a is the height of the rectangular laminar flow channel; b is its width; and L is its average length. $\Delta P_{Lam}$ is the pressure drop across the laminar flow channel. $\mu$ is the absolute viscosity of the fluid. Although our tests show that Equation (1) underestimates $Q_i$ by 10% to 20%, this does not limit its proper expression of the flow physics and its utility for the purposes herein. The total volumetric flow rate, Q, for a laminar flow assembly consisting of n such rectangular channels is $Q = n \times Q_i$.

Based upon Brower, William B., "A Primer in Fluid Mechanics," CRC Press, Boca Raton, 1999, Pages 130–334, one can express the total volumetric flow rate, Q, through the instrument of the present invention other transverse flow assembly geometries as follows:

$$Q = [C/\mu]\{P_1 - P_2 + [1/(2A_1^2) - 1/(2A_2^2) - F]\rho Q^2\} \quad (2)$$

In Equation (2), $P_1$ represents the static pressure at the device inlet pressure port; $P_2$ is the static pressure at the outlet pressure port; $A_1$ is the flow area at the inlet pressure port; and $A_2$ is the flow area at the outlet pressure port. F is a function of the Reynolds number of the flow and constant geometry. F accounts for so-called permanent pressure losses from the inlet pressure port to the outlet pressure port associated with dynamic pressure ($\rho Q^2$) effects, but not the laminar-flow pressure drop, $\Delta P_{Lam}$, across the laminar flow assembly. The function, F, includes wall friction in the internal bore of the laminar flow assembly and in the exit channel, right-angle bends in the streamlines entering and exiting the laminar flow assembly, acceleration and deceleration of streamlines entering the laminar flow channels due to their non-constant length, pressure losses entering and exiting the laminar flow channels, and the entry length required to establish fully developed laminar flow in the laminar flow channels. C is a constant depending only on geometry and is expressed as:

$$C = n \, [a^3 b/(1+a^2/b^2)][1/(12L)] \quad (3)$$

In addition, the following assumptions have been made in application of equation (2): that the flow is steady state; the mass density, $\rho$, is constant; and changes in elevation from the inlet pressure port to the outlet pressure port are negligible. In practical and commercial flow meters, all these assumptions are substantially valid, and Equation (2) properly expresses the flow physics for the purposes herein.

These equations allow for demonstrating the contrast between transverse-flow laminar flow assemblies according to the present invention with those of a commonly used type of known laminar flow assembly—both of which have been tested by the Inventor hereof. Referring to Equation (1), one observes that the major contributor to the flow rate tolerance of rectangular laminar flow channels is the geometric factor $a^3 b/[1+a^2/b^2]$, which, in turn, is critically dependent upon the channel height, a, because this dimension is raised to the third power.

For the purpose of numerically comparing laminar flow assemblies of the present invention with those of known technology, some description of the subject systems is in order. One laminar flow unit of the preferred embodiment comprises of a plurality of adjacent slices—one open slice and one closed slice. The closed slice of the pair is an annular flat disk which allows no transverse flow through it. The open slice of the pair defines one or more transverse-flow rectangular laminar flow channels when it is assembled with adjacent closed slices compressed against both of its flat faces. A stack of such slices includes a flow nozzle at one end of the stack and a blank end plate at its other end. Flow passes within the bore defined within the interior of stack, outward, through the flow channels defined by the gaps defined between adjacent plates. In another variation, the stack may be defined by partial plate segments. In one example the plates are C-shaped. Then, these forms will be stacked one upon the other in such a way that the open sections are separated from each other. In another example, the segments to stack may subtend less than 180 degrees. These will generally be doubled-up and stacked in an offset pattern to similar effect.

Reference is made to the former exemplary mass flow meters and mass flow controllers according to the present invention with a range of 0 to 50 standard liters per minute. In this example, each open "slice" of a laminar flow assembly is defined by three pie-shaped "washers" fabricated from 0.0025±0.0002 thick 316 stainless steel sheet stock sandwiched between an annular disk, washer or toroidal form. Each of the three transverse-flow rectangular laminar flow channels of each open slice has a height, a, of 0.0025±0.0002 inches and a width, b, of 0.340±0.005 inches. In actual practice, the height, a, of each rectangular channel is closer to 0.0025±0.0001 inches.

Each slice of a comparable known laminar flow assembly for the referenced rate of flow consists of an annular disk fabricated of 0.006 thick 316 stainless steel sheet stock. Each such disk has approximately 80 small rectangular radially directed laminar flow channels chemically etched into one face of the disk. The height, a, and width, b, of each such channel are 0.0025±0.0005 inches and 0.008±0.001 inches, respectively. The commonly used chemical etching process, or similar processes, are responsible for the relatively poor tolerances of the channel dimensions.

Based on the above example, the maximum variation in the geometric factor $a^3b/[1+a^2/b^2]$ from its average value to its maximum value is 28% for the laminar flow assembly of the referenced embodiment of the present invention, whereas it is 92% for the known chemically-etched-based laminar flow assembly. If the height, a, of the laminar flow channel of a construction according to the present invention has its practical better-toleranced value of 0.0025±0.0001 inches, this maximum variation becomes 14%. As such, the present invention provides a calculated flow rate tolerance that falls within a practical manufacturability tolerance range of ±30%, whereas the known design falls far outside the acceptable tolerance range.

In test experience, we have found that the present invention provides almost an order of magnitude improvement in tolerances over the known technology and thereby yields a total instrument assembly time reduction in the range of 10% to 25%, all ultimately yielding a cost-reduction benefit to the instrument's user. This time reduction stems from there being no need to add or remove slices from the stack following testing as is usually required in tuning an assembly with the chemically etched slices. Of course, the reproducibility of the laminar flow channels also increases the accuracy of flow rate measurement.

Additionally, it is to be understood that fluid flow entering the inlet process connection of an instrument is non-uniform, swirling, and turbulent because the conduit just upstream has upstream flow disturbances generated by elbows, contractions, expansions, and valves. The flow then passes through a pipe or fitting within the inlet process connection which creates a relatively high velocity jet containing the non-uniformities generated by the upstream flow disturbances.

In the case of known instruments, the non-uniform jet enters the inlet chamber of the flow body and then either directly enters the laminar flow assembly, or, preferably, in some known instruments, is intercepted at the downstream end of the inlet chamber by an inlet filter which removes particulate contaminants and helps uniformize the flow. The upstream pressure port is located just upstream of the laminar flow assembly and downstream of an inlet filter. At higher flow rates, an inlet filter is unable to sufficiently uniformize the flow because the central portion of the jet essentially punctures through the center of the filter. With or without an inlet filter, the end result is that known transverse-flow instruments have a non-uniform, swirling, and/or turbulent flow with an undefined flow area at the inlet pressure port of the instrument. This has the deleterious effect of creating dynamic pressure components proportional to $\rho Q^2$ at the inlet pressure port.

For proper operation, the upstream pressure, $P_1$, at the inlet pressure port should be a purely static pressure, absent of any dynamic pressure component. If $P_1$ has any dynamic pressure component, the pressure drop $(P_1-P_2)$ across the laminar flow element will not be linearly proportional to the volumetric flow rate, Q, resulting in a degradation in the instrument's accuracy, whether the sensor is a differential pressure transducer or a mass flow sensor. Additionally, such a non-uniform flow entering the laminar flow assembly further degrades accuracy, again due to dynamic pressure effects.

To account for such effects, the present invention may include a flow deflector, or like means, located a sufficient distance downstream of the exit plane of the inlet process connection to permit the jet exiting therefrom to strike the flow deflector, thereby substantially obliterating any memory of upstream disturbances. The flow is deflected outwardly by this body, bends around the flow deflector following the containment provided by the bore of the inlet chamber, and generally spreads out over the cross-sectional area of the inlet chamber with a velocity profile that is substantially more uniform and reduced in magnitude than that which exists in its absence. In this manner, the flow deflector reduces the above-mentioned problems of upstream flow disturbances and the jet.

One embodiment of the flow deflector is essentially a circular plate with a diameter larger than that of the bore of the inlet process connection. However, the flow deflector may comprise any axisymmetric body at the specified location that has a conical, spherical, aerodynamic, or other contour, or any other flow deflector that accomplishes the stated purpose.

In a preferred embodiment of the invention, the flow in the inlet chamber after it has passed beyond the deflector enters an inlet filter comprising a porous metal plate or plug such as made of sintered 316 stainless steel powder. Alternative inlet filters include one or more screens, alternative porous plates, perforated plates, or other filtering means as known in the art. The inlet filter further uniformizes the flow so that, when used in combination with the flow deflector, the flow exiting the inlet filter has a velocity profile that is substantially uniform, substantially devoid of flow irregularities, and independent of upstream flow disturbances.

The flow exiting the inlet filter preferably then proceeds through a flow nozzle—yet another optional feature of the present invention. The flow nozzle has a contour which provides a smooth transition from a larger cross-sectional flow area of the inlet filter to a smaller cross-sectional flow area of the internal bore of the laminar flow assembly. The inlet pressure port is located in the throat of the flow nozzle in a length with constant area, $A_1$, such that the port senses the static pressure, $P_1$, devoid of any dynamic pressure component.

In a preferred embodiment of the present invention, the cross-sectional flow area at the inlet pressure port, $A_1$, is identical to the cross-section flow area of the internal axial bore of the laminar flow assembly. Alternatively, these areas may be different if the transition between the two areas is sufficiently smooth and minimizes dynamic pressure $(\rho Q^2)$ effects. The contour of the flow nozzle may be circular—though the contour may be substantially elliptical, conical, or any other contour that accomplishes the purpose herein, including those contours that have a smooth transition into their throat, that minimize any separation of the flow from the nozzle's walls, and that have a minimum vena contracta. As such, use of the term "diameter" refers to both circular and other shapes as, for example, in the context of a shape's aerodynamic diameter.

With such a nozzle, the flow accelerates through the flow nozzle and thereby is further flattened and uniformized prior to passing the inlet pressure port in its throat. Thus, use of such a nozzle in the present invention further reduces any dynamic pressure effects on $P_1$ and provides a uniform defined velocity $(V_1=Q/A_1)$ at the inlet pressure port. As such, the combination of the flow deflector, inlet filter, and flow nozzle provides compact inlet flow conditioning over a short length and, itself, forms an independent aspect of the present invention—as do at least each of the nozzle and deflector.

As introduced above, another aspect of the invention concerns the manner in which the transverse laminar flow conduits are formed in a stack of individual "slices". For ease of inclusion within a flow meter or controller housing, the outer periphery of the subunits, and hence the flow body assembly they define, is advantageously (though not necessarily) circular.

In one variation of the invention, three equally spaced end plate screws pass through clearance holes in the end plate and clearance holes in all parts of each slice in the stack and screw into the nozzle piece, creating a laminar flow assembly consisting essentially (from upstream to downstream) of the flow nozzle, stack of slices, and end plate. In the alternative, a number of symmetrically arranged bolts can thread into an end plate. Even when sandwiched between basic plates, the bolts and overall structure are adapted to evenly and tightly compress the slices defining the flow body. The screws are tightened sufficiently so that: (1) the entire laminar flow assembly is tightly compressed with all parts secured in position and immovable, and (2) the total transverse leakage flow rate between the slices in the stack is less than approximately 0.05% of the total flow rate passing through the rectangular laminar flow channels of the assembly and therefore constitutes a negligible effect.

Of course, due to the exceedingly small spaces through which such leakage may flow, any such leakage flow rate is strictly laminar in nature. It can be and typically is accounted for during flow calibration of the instrument; and is, where all the parts of the laminar flow assembly are made of the same material (or material closely matched in its thermal expansion coefficient—as desired), unaffected by thermal variances since in such instances the material will expand or contract together.

As mentioned above, various design options are provided for the slices making up the laminar flow stack according to the present invention. In one variation, "open" slices are staked with "closed" slices. In another variation, open slices are stacked upon one another, in an offset fashion in order that adjacent closed sections define top and bottom sections, whereas side sections of slices define side walls of the flow channels. Common to each variation is the stacking approach in which the edges of holes through layers and opposing surfaces of layers of the stack, together, form the flow channels.

In the case of the alternating open/closed slice approach, in a meter designed for higher flows, the flow assembly has three identical transverse-flow rectangular laminar flow channels formed by three identical and generally pie-shaped flat washers equally spaced on the annular flat disk of the closed slice. Each such washer preferably has: (1) an outer radius equal to, and conforming with, that of the outer radius of the annular closed slice; (2) an apex with a virtual radius equal to, and conforming with, that of the inner radius of the annular closed slice; and (3) two straight sides angularly oriented so that, when assembled with adjacent closed slices, they form side walls of the three rectangular laminar flow channels such that the width, b, of all three channels is equal and is constant over it's average length, L. In this way, the side walls of the channel are not radially oriented.

For lower flows, the open slice may define a single transverse-flow laminar flow channel formed by an annular, "C"-shaped flat disk, or washer, with a single transverse slot in it. This "C"-shaped washer has outer and inner radii equal to, and conforming with, that of an annular closed slice if one is to be used. The two straight sides of its slot are angularly oriented so that the slot has an equal width over its length, such that, when assembled with two adjacent closed slices, it forms a rectangular laminar flow channel with a constant width, b, over its length, L. In the alternative, the C-shaped washers can be stacked one upon another in an offset fashion in order that closed sections of the washer act as top and bottom to the flow channels. In either case, again, the side walls of the channel are purposely not radially oriented. Other configurations, in addition to those also shown and described below comprise yet further variations of the invention.

As for the various slices stacked to form the laminar flow body, they are formed from sheet stock with a thickness that is highly uniform and has tight tolerances. Shim stock as referenced above offers one exemplary starting material. The material may be stainless steel, or another material. The material is advantageously cut into its desired shape by die cutting or stamping. Still, other manufacturing techniques can be employed.

In any case, a transverse flow laminar flow assembly according to the present invention typically comprises a plurality of slice layers of sheet stock. The sheet stock is advantageously metal shim stock in view of the tight tolerances available for such material. In order to foster laminar flow, layers forming transverse channels in the flow body will typically have a thickness of between about 0.001 and about 0.050 inches. Layers that only cap or provide a ceiling or floor of an open channel may be of any thickness. Alternatively, the layers on either or both sides of an open slice or layer may have a thickness of between about 0.001 and about 0.050 inches. Such an approach may be adopted simply to conserve space or for other manufacturing reasons. Still further, since the layers on either side of an open intermediate layer or slice may also be open in order to form one or more transverse channels, all of the layers may advantageously be provided in the same thickness.

In the overall manufacture of the subject instruments, a range of discrete standard full-scale flow rates is often required. The full-scale, or maximum, flow rate is determined by the number of laminar flow units in the laminar flow assembly stack. Efficient manufacture requires that a known predetermined number of laminar flow units repeatably yield a known full-scale flow rate within reasonable manufacturability tolerance range of about ±30%. If this is the case, the laminar flow assembly stacks can be preassembled, withdrawn from stock as needed, assembled into the instrument's flow body, and, when flow-calibrated, yield the desired full-scale flow rate within an acceptable tolerance range without further adjustment, thereby avoiding additional labor cost.

Such a result is possible in accordance with the present invention, whereas it is not with other known systems. In known transverse-flow laminar flow assemblies, the tolerance of the full-scale flow rate of a laminar flow assembly stack can approach 100%. In these known cases, labor cost economies associated with preassembly for stock are unattainable. Labor inefficiencies also arise. When assembled into the instrument's flow body, flow-calibrated, and found to be out of tolerance, such known laminar flow assemblies must be removed from the flow body and have an appropriate number of laminar flow units added or subtracted from the laminar flow assembly-stack as indicated by the results of the initial flow calibration.

The corrected stack is then reassembled into the flow body and recalibrated. The required full scale flow rate still may not be within tolerance, in which case one or more further iterations are required. Clearly, all this activity adds up to substantially higher labor cost for the instrument.

To understand another feature or advantage of the present invention, we refer to Equation (2) above. In a perfect instrument, Equation (2) would be expressed as $Q=[C/\mu][P_1-P_2]$ (i.e., the pressure drop, $P_1-P_2$, senses only the pressure drop across a laminar flow assembly having a perfect laminar flow). In practice, however, this perfect instrument is always contaminated with some errors associated with dynamic pressure effects.

In Equation (2), dynamic pressure effects are embodied in the expression $[1/(2A_1^2)-1/(2A_2^2)-F]\rho Q^2$. The first two terms in this expression are the dynamic pressures, $\rho V_1^2/2$ and $\rho V_2^2/2$, at the inlet and outlet pressure ports, respectively, where $V_1$ and $V_2$ are the flow velocities at the upstream and downstream pressure ports, respectively. As more fully described in the previous explanation of Equation (2), the third term F, in this expression accounts for all permanent pressure losses between the inlet and outlet pressure ports, except for the pressure drop across the laminar flow assembly. For air at atmospheric pressure and room temperature, the dynamic pressure, $\rho V_1^2/2$, at full-scale flow is approximately one-tenth of the pressure drop across the laminar flow assembly. At higher pressures this fraction is larger. In some known meters, the areas $A_1$ and $A_2$ are not equal and/or the flow path between pressure ports is tortuous. In such instruments, errors caused by $\rho Q^2$ effects can be significant.

In a preferred variation of the invention, the areas are instead equal or nearly so. Such an approach reduces the previously mentioned dynamic pressure expression to $-F\rho Q^2$. Furthermore, to minimize the factor F, the flow path between the pressure ports in the present invention may be made as smooth as is practicable. These measures combine to yield nearly linear Q vs $P_1-P_2$ performance from zero to full-scale flow for the instruments of the present invention. No know meter is believed to offer comparable performance.

As an alternative to the above approach, it is possible to reduce the dynamic pressure expression to nearly zero by either reducing the inlet area $A_1$ sufficiently such that $1/(2A_1^2)-1/(2A_2^2)=F$, or by adjusting any one or more of the three terms in the dynamic pressure expression such that the sum $1/(2A_1^2)-1/(2A_2^2)-F=0$. This method facilitates effectively "tuning" the design of the instruments to nearly eliminate dynamic pressure effects.

Although the preferred embodiment of the present invention as more particularly described below may offer all of the benefits or advantages based on a combination of features as described above, the individual aspects noted may be regarded and claimed independently below or in any combination or permutation with the other features discussed herein. In addition, methodology as implicitly or explicitly disclosed—especially in connection with the systems described form part of the invention.

BRIEF DESCRIPTION OF THE DRAWINGS

Each of the figures diagrammatically illustrates aspects of the invention. Of these.

Variation of the invention from that shown in the figures is contemplated. The figures and following detailed description are provided merely for illustrative purposes of selected non-limiting examples of the present invention. This subject matter is not to be taken in a limiting sense, but is presented merely for the purpose of explaining certain general principles of the inventions as elaborated upon below.

DETAILED DESCRIPTION

Before aspects of present invention are described in detail, it is to be understood that the invention is not limited to particular variations set forth and may, of course, vary. Various changes may be made to the invention described and equivalents may be substituted (both presently known and future-developed) without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

As noted above, FIGS. 1A and 1B show known flow meter 1 and flow controller 2 configurations, respectively, as may be utilized in connection with a transverse flow assembly according to the present invention. In each device fluid (typically a gas) from a system conduit 3 enters the inlet process connection 6 of the meter or controller body 7. Within the body, flow passes through a laminar flow assembly 19, exits through an outlet process connection 40 of the flow body, and continues its flow within the conduit system 3.

Figure 1A:
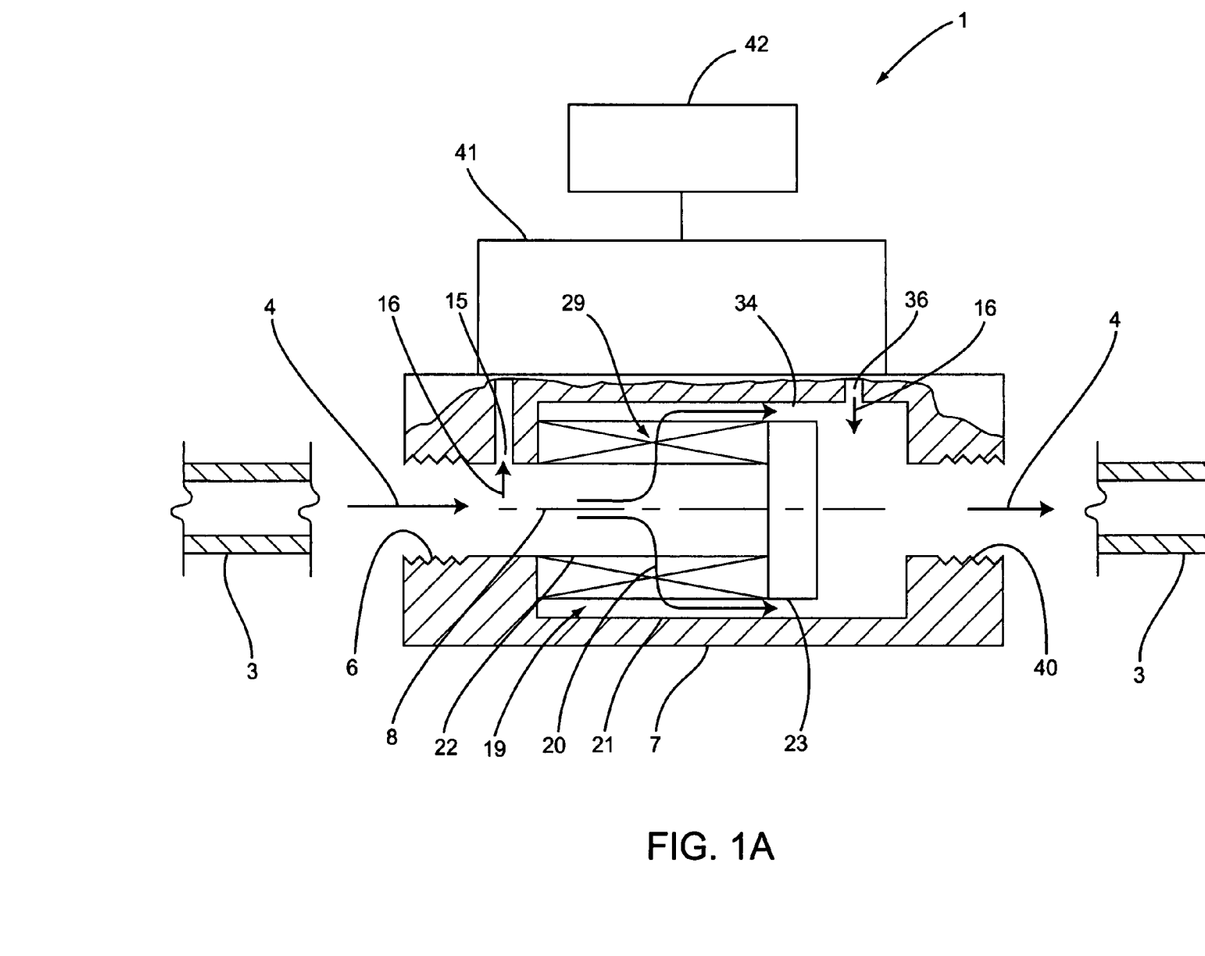
FIG. 1A is a sectional view of a known flow meter configuration that is likewise applicable to the present invention.
Figure 1B:
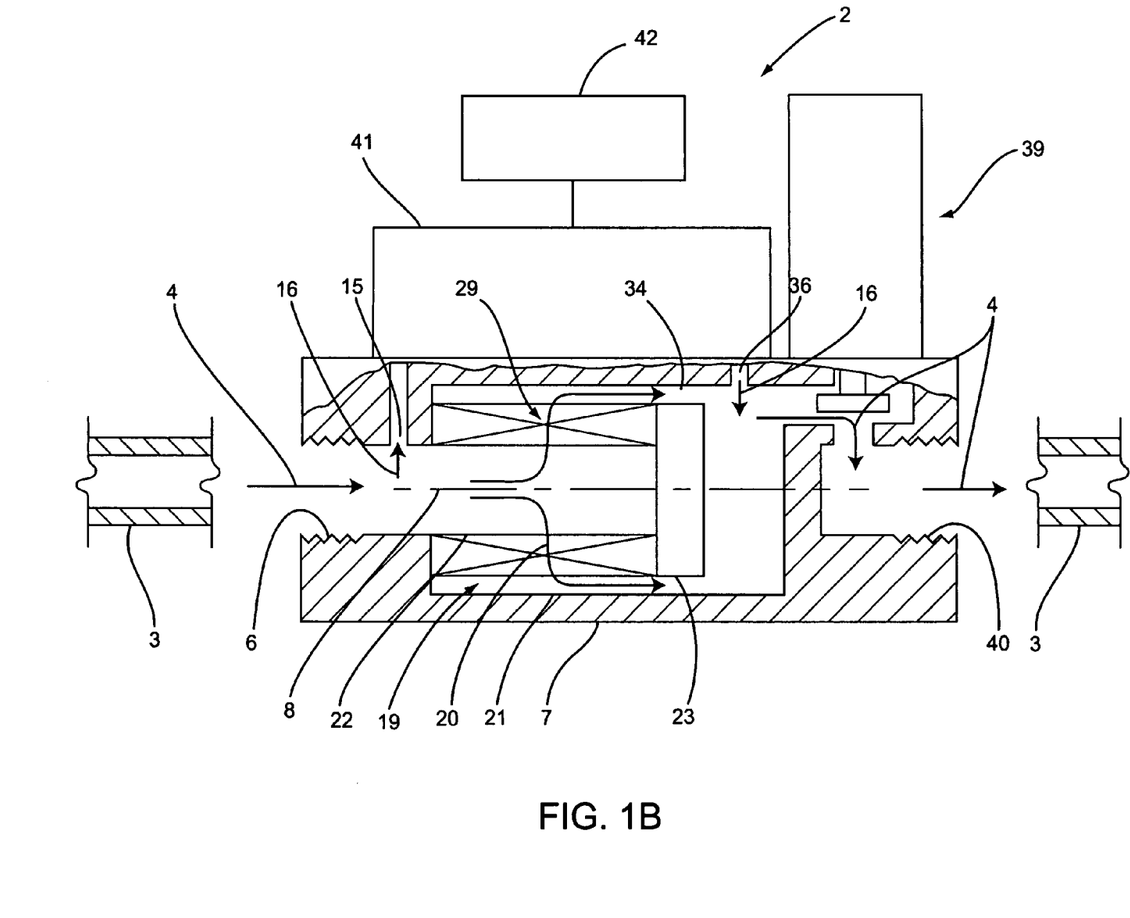
FIG. 1B is sectional view of the device of FIG. 1A, configured for use as a flow controller.

The fluid passing thorough the body drops in pressure between an inlet pressure port 15 and an outlet pressure port 36 arranged on opposite sides of the laminar flow assembly 19. The pressure drop ($P_1-P_2$) is sensed by a differential pressure sensor 41.

In cases where the flow sensor is to be a mass flow sensor, a minority fraction 16 of the flow rate passes through a channel or conduit (hidden) spanning the pressure ports. In a volumetric flow meter, there is no such flow. Again, for use as a mass flow sensor the instrument may comprise upstream and downstream resistance temperature detector (RTD) type sensors. Other suitable types of sensors as noted above may be employed as well depending upon the application of the device as volumetric flow meter or mass flow. Furthermore, the volumetric flow meter and mass flow meters may be configured as volumetric or mass flow controllers, respectively, when a flow control valve 39 is supplied to the flow body as shown in FIG. 1B.

Device electronics 42 operate the sensor 41 shown in FIGS. 1A and 1B. The electronics conditions the output signal, and typically delivers a linear output signal. In the case of the flow controller embodiment 2 shown in FIG. 1B, the electronics may also operate the integral flow control valve 39. In which case, an external flow-rate set-point signal is compared with the measured flow rate signal, and the flow control valve is either opened or closed in a feedback control loop using a conventional control algorithm so that it maintains the desired set-point flow rate within specified accuracy.

In a meter or controller with a transverse laminar flow geometry as shown in FIGS. 1A and 1B, the total fluid flow 4 enters the internal bore 22 of the laminar flow assembly 19. The fluid streamlines 20 then make a bend substantially perpendicular to the axis of the flow body bore 8; they then pass in a sheet-like pattern transverse to the axis through one or more laminar flow channels 29 in the laminar flow assembly 19.

Accordingly, in passing through the flow channels, the flow turns substantially perpendicular to the axis of the flow body. Next it makes a another substantially right-angle turn into the exit channel 34 formed between the diameter of the flow body bore 21 and the outer diameter of the laminar flow assembly. Such action occurs because an end plate 23 blocks flow through the internal bore of the laminar flow assembly 19. The end plate may be employed to help hold the laminar flow assembly 19 together as well.

As noted above, the laminar flow assembly employed in the type of meter or controller in FIGS. 1A and 1B may be constructed according to the invention as elaborated below. Yet, other aspects of the invention offering improvement to known transverse laminar flow meters/controllers are described in connection with FIG. 2.

Figure 2:
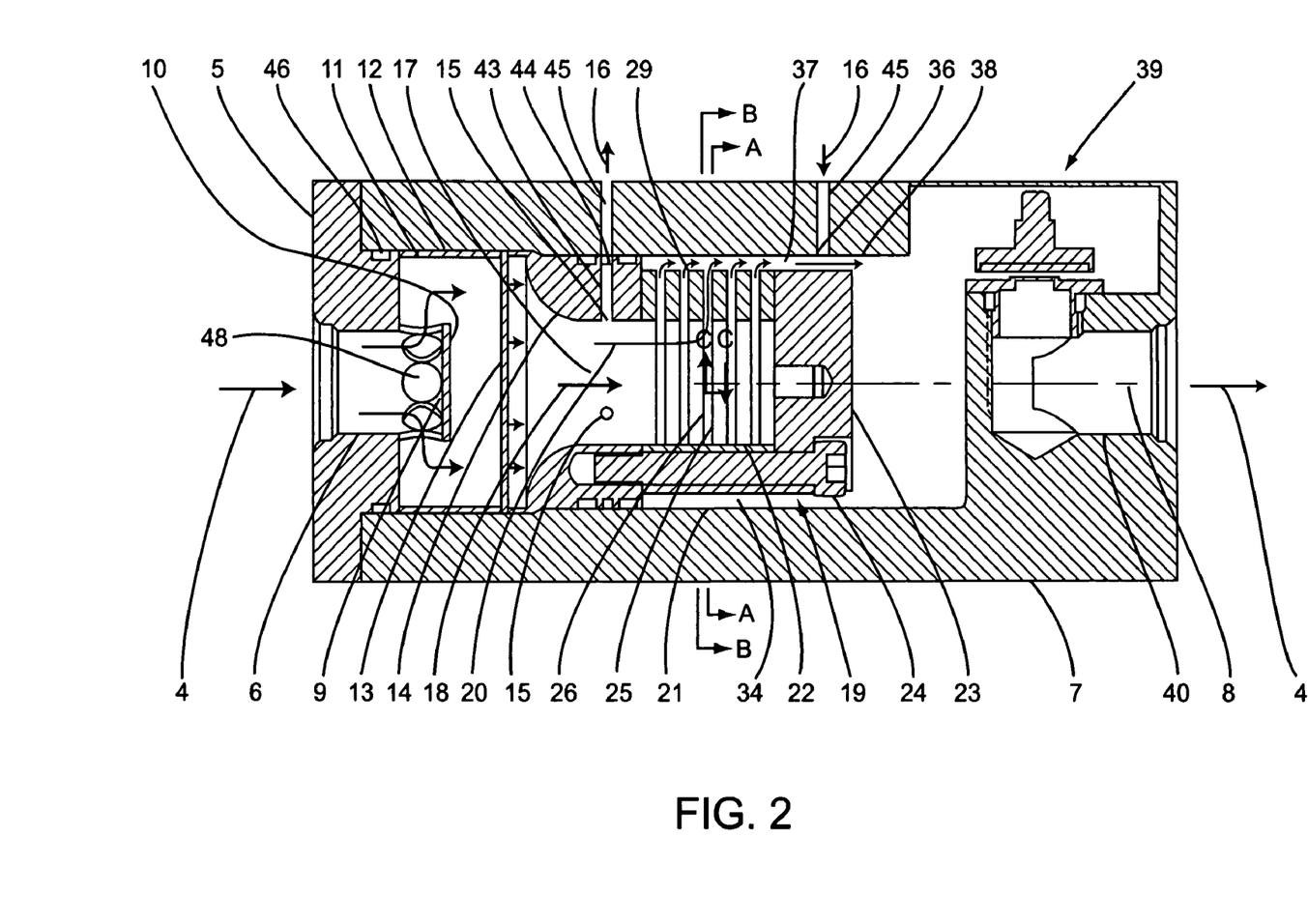
FIG. 2 is a sectional view of a flow controller according to one aspect of the present invention.

Specifically, FIG. 2 presents a longitudinal section of a flow body and internal parts of the preferred embodiment of instruments according to the invention. Although, for illustrative purposes, the flow body 7 shown in FIG. 2 is that of a mass flow controller, the invention described therein applies to all of the instruments—volumetric flow meters, volumetric flow controllers, mass flow meters, and mass flow controllers. For simplicity, the subject figure does not show the conduit, mass flow sensor, and electronics, and it shows only the plug and seat of the flow control valve. To better depict the flow through the open slices in the laminar flow assembly, only five open slices are shown in FIG. 2, and the thicknesses of the open slices and closed slices are exaggerated.

In practice, the number of transverse flow channels and corresponding layers or slices in the assembly will, naturally, vary. The transverse flow assembly may be designed for flows any where from a fraction of a liter to 1000 liters per minute, or more. Accordingly, the invention contemplates situations where at least one laminar flow channel and as many as 1000, or more, may be employed. Stacks upward of 500 slice elements with correspondingly numbered transverse laminar flow channels may be employed. However, it is to be appreciated that it will generally instead be advantageous to enlarge, for example, the device diameter and have larger laminar flow channels (still having a low enough Reynolds number to ensure laminar flow) rather than simply increasing the number of layers that need to be assembled to accommodate a given application. Such variation in design will be specific to a given application and such optimization is within the common level of skill in the art.

In any case, FIG. 2 illustrates the total mass flow rate 4 (M) of the flowing fluid in the conduit enter the inlet process connection 6 in the inlet block 5 of the flow body 7. It strikes an optional plate-like flow deflector 9 in the flow deflector hub 10, which is part of the inlet block. The flow then proceeds radially outwardly through equally-spaced holes 48 in the flow deflector hub. The flow outward from and around the flow deflector hub will generally conform to the containment provided by the cylindrical bore of the inlet chamber 11.

The flow then passes through an optional porous, disk-shaped metallic inlet filter 13 that may be held in place by tubular inlet filter spacer 12. This filter further helps uniformize the flow. The flow then accelerate through an optional contoured flow nozzle 14. The nozzle may be circular or otherwise configured as noted herein.

Advantageously, three equally spaced inlet pressure ports 15 are located in the nozzle throat to sense the inlet pressure ($P_1$) leading to a mass flow sensor via three radial channels 43 running from each port to a circumferential groove 44 in the flow nozzle, itself connected to a sensor channel 45 leading to the sensor.

The majority fraction of flow (in the case of a mass flow meter and controller, or all of the flow in a volumetric flow meter and controller) enters the internal bore of the annular laminar flow assembly 22. The bore is advantageously cylindrical, but can be otherwise configured. Portions of the flow then bend perpendicularly to the axis of the flow body bore 8 and enter into the laminar flow assembly 19, and as shown by the flow arrow 20, pass through the laminar flow channels 29 formed by the adjacent open and closed lices of the laminar flow assembly.

In the example of the invention shown in FIG. 2, the mode of construction employs open slices 26 sandwiched between adjacent closed slices 25. Other constructional approaches are elaborated upon below.

In any case, the flow streams exit the laminar flow channels and make a right-angle bend into what is advantageously a constant-area annular exit channel 34 formed between the inner diameter of the cylindrical flow body bore 21 and the outer diameter of the annular laminar flow assembly. The flow then proceeds parallel to the axis of the flow body bore, passing an outlet pressure port 36 located in the exit channel which senses outlet static pressure ($P_2$).

The flow then travels past an end plate 23 that may be employed in compressively holding together the laminar flow assembly stack by means of end plate screws 24 set into the downstream face of the flow nozzle. In the case where the device is a flow controller, the flow then passes through integral flow control valve 39 that throttles the flow in such a manner that it maintains the set-point mass flow rate. The flow finally exits the flow body via the outlet process connection 40 back into the conduit system. In the case where the device is a flow meter, the streamlines passing over the end plate do not pass through a flow control valve, but instead directly exit the flow body via the outlet process connection and pass back into the conduit.

Regardless of the configuration, the fluid is preferably sealed from the outside by means of elastomeric "O"-rings 46, usually of a fluorocarbon material, although other materials and seal cross-sections can be used. Internal parts such as the flow nozzle and valve seat are likewise preferably sealed. All wetted parts of the mass flow controller may be made of 316 stainless steel, although alternative metallic and plastic materials can be suitable.

To recap the operation of the device here, in passing through the laminar flow assembly, the fluid experiences a pressure drop, $P_2$–$P_1$, between the inlet pressure ports ($P_1$) and the outlet pressure port ($P_2$). As configured, the inlet and outlet pressure ports sense only static pressure, because the fluid velocity vector at the inlet pressure port 18, $V_1$, and the fluid velocity vector at the outlet pressure port 38, $V_2$, are parallel to the ports. In addition, the flow area at the inlet pressure port 17, $A_1$, is preferably identical to the internal circular flow area of the annular laminar flow assembly and is identical to the annular flow area at the outlet pressure port 37, $A_2$, (i.e., $V_1=V_2$) thereby reducing accuracy degradation due to dynamic pressure ($\rho Q^2$) effects. In the case of volumetric flow meters and volumetric flow controllers, the sensor is a differential pressure sensor that measures $P_1$–$P_2$. In the case of mass flow meters and mass flow controllers, the sensor is a mass flow sensor as more fully described previously. In the mass flow case, the pressure differential, $P_1$–$P_2$, forces a minority fraction 16, $M_2$, of the total mass flow rate, M, to enter the inlet pressure ports; pass through inlet sensor channel 45; pass through the mass flow sensor; pass through outlet sensor channel 45; and exit the outlet pressure port of the flow body. Volumetric flow meters and volumetric flow controllers have no such flow entering or exiting the inlet or outlet pressure ports, respectively.

Figure 3:
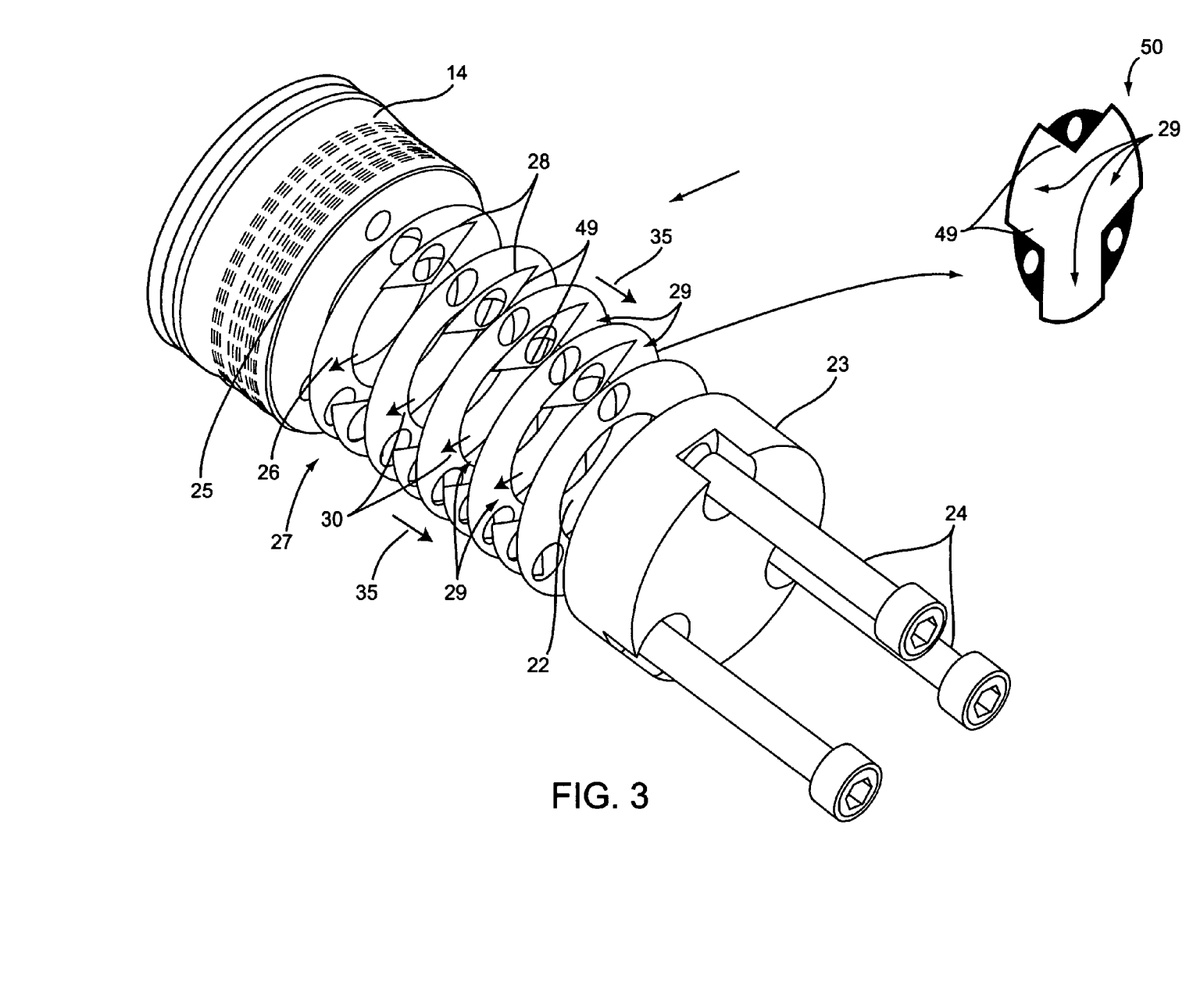
FIG. 3, is an exploded perspective view of a transverse laminar flow assembly stack and an alternative open element.

As noted above, the invention contemplates a number of different approaches for assembling the transverse laminar flow assembly or unit. An exploded view of the laminar flow assembly 19 such as illustrated in FIG. 2 is shown in FIG. 3. Laminar flow channels 29 are provided by opposing surfaces of open material. That is to say, adjacent layers of material in the individual slices employed in creating a stack provide both opposing surfaces of a flow channel ("top" and "bottom") as oriented along the flow axis of an assembly. The "sides" of a flow channel may be provided as a single piece of material in a layer or slice of the assembly, or by a plurality of pieces (i.e., as few as two). By constructing a laminar flow assembly in this manner, uncontrolable radii along the flow channel as produced in etched pieces are avoided. Furthermore, the flat stock selected for producing the layers can be obtained in conform to very tight tolerances. The irreproducibility associated with etching a desired depth channel is avoided. Instead, material stock of a desired height or thickness is simply selected. Furthermore, by using stock in a stacked arrangement to define the flow channels, surface finishes will be excellent—especially in comparison to etched pieces. What is more, channel number and width are easily set by virtue of the configuration of the open slices or washers/spacers utilized in the structure.

In the arrangement shown in FIG. 3, the laminar flow assembly 19 comprises an entry flow nozzle 14, a stack of four laminar flow units 27 having an internal bore 22, an end plate 23, and end plate screws 24 securing the arrangement. Each laminar flow sub-unit in this variation of the invention includes: (1) an annular closed slice 25; (2) an intermediate open slice 26 comprising with three pie-shaped washers 28, and (3) an opposing surface to the open slice which may comprise another closed slice 25. The fluid velocity vectors 30 exiting each laminar flow channel combine together and become the flow through the exit channel 35. Instead of the open slice between the closed slices comprising independent pieces, however, it is noted that the laminar flow channels 29 defined by side features 49 may be provided by an interconnected "open" slice member 50 and switched-out as indicated to provide an open slice 26 as shown.

Figure 4:
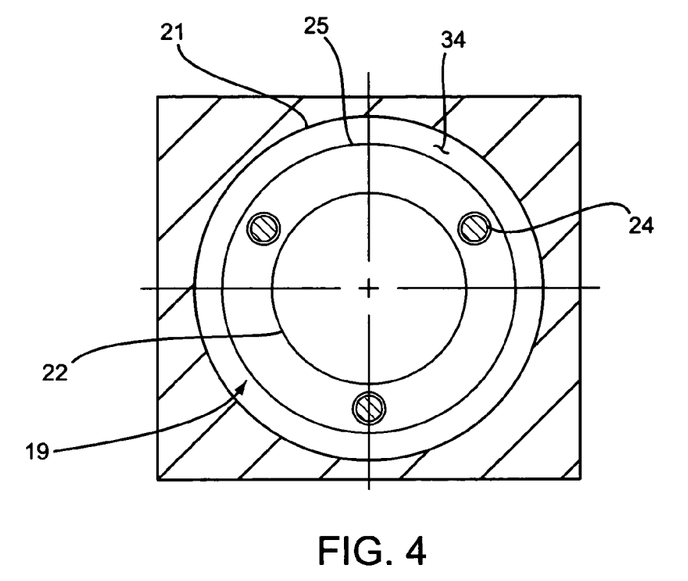
FIG. 4 is sectional view along line A—A of FIG. 2.
Figure 5:
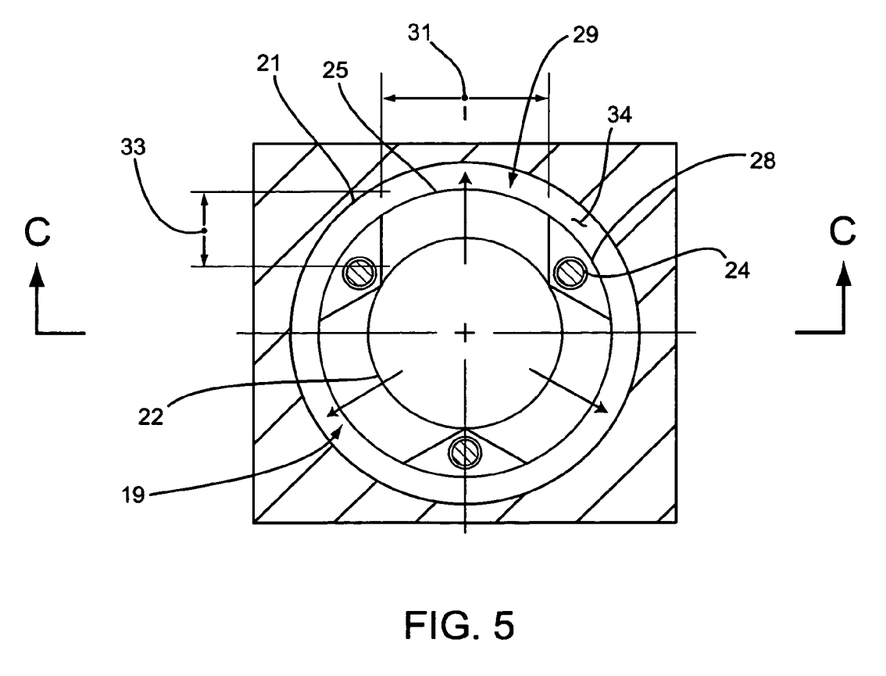
FIG. 5 is sectional view along line B—B of FIG. 2.

Turning now to FIGS. 4–9, these show various sections A—A, B—B, and C—C of the FIG. 2 device and section C—C of the device in FIG. 5 that more fully describe and offer optional configurations for alternatives thereto. First, FIG. 4 illustrates a transverse section along line A—A of FIG. 2 showing the annular closed slice 25 of the laminar flow assembly 19. FIG. 5 is a transverse section along line B—B of FIG. 2 showing the laminar flow assembly 19 and its internal bore 22. Both figures also show three end plate screws 24 passing through clearance holes, an exit channel 34, and the flow body bore 21.

Figure 6:
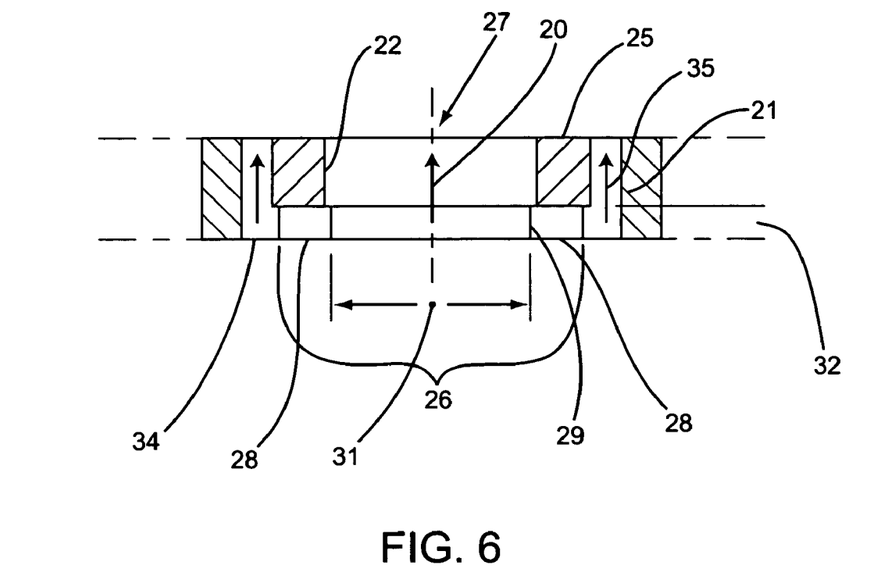
FIG. 6 is sectional view along line C—C of FIGS. 2 and 5.

FIGS. 5 and 6 illustrate a higher flow-rate laminar flow unit 27 of the laminar flow assembly 19 in which three laminar flow channels 29 are defined between the open and closed slices by the three substantially pie shaped washers 28. Washers 28 define—together—open slice 26, as they sit adjacent to the annular closed slice(s) 25. The open slice, when sandwiched between two adjacent closed slices 25, create three rectangular laminar flow channels 29, each having a thickness or height 32, a, width 31, b, an average length 33, L, and a transverse fluid velocity vector 30 flowing outwardly from the internal bore of laminar flow assembly 22 to the exit channel 34 formed within the flow body bore 21. For clarity, the thicknesses of the open and closed slices in FIG. 6 are exaggerated.

FIGS. 5 and 6 show the streamlines of the flow entering the laminar flow assembly 20 pass through the internal bore of the laminar flow assembly 22, make a right-angle bend, pass into the three rectangular laminar flow channels, make another right-angle bend; and flow into the exit channel 34 formed within the flow body bore 21. FIG. 6 also shows the flow through the exit channel 35. The transverse fluid velocity vector through the laminar flow channel shown in FIG. 6 is directed outwardly toward the viewer.

It is to be understood that washers 28 in FIGS. 5 and 6 could have shapes other than the substantially pie-shaped washers shown, all variations of which are covered by the present invention. For example, for smaller flow bodies, the washers may be substantially trapezoidal-shaped for the purpose of providing sufficient area for the end-screw clearance holes, yet still form rectangular laminar flow channels of equal width over their length. Additionally, substantially trapezoidal-shaped washers can have their two straight sides angled in such a manner that they create channels that direct their flow in a direction that is purely radially outward.

Any washer design in which the flow is purely radial will experience a dynamic pressure effect because the flow through the channels decelerates as it flows out radially in conformance with the physical constraint of continuity of mass flow through each channel. Another variation of washer shape is annular-shaped washers, which may possess advantages in fabricating the laminar flow assembly stack, but which likewise experience dynamic pressure effects as the flow in the channels first accelerates and then decelerates as it flows around the annular washers.

Figure 7:
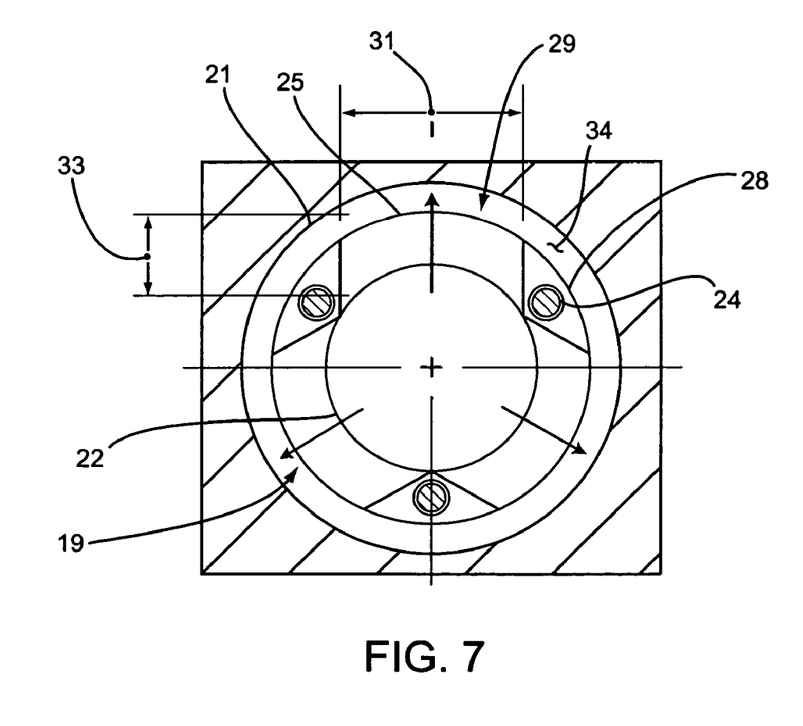
FIG. 7 is an alternate sectional view along line B—B of FIG. 2.

FIG. 7 is a transverse section along line B—B in FIG. 2 showing a lower flow rate laminar flow unit of the laminar flow assembly 19. In FIG. 7, the open slice of the assembly is created by a substantially "C"-shaped washer 28, which, when compressively sandwiched between two adjacent annular closed slices 25 (such as by end plate screws 24), forms a single rectangular laminar flow channel 29 having a width 31, b, an average length 33, L, and a transverse fluid velocity vector 30 flowing outwardly from the internal bore of the laminar flow assembly 22 to the exit channel 34 formed within the flow body bore 21.

Figure 8:
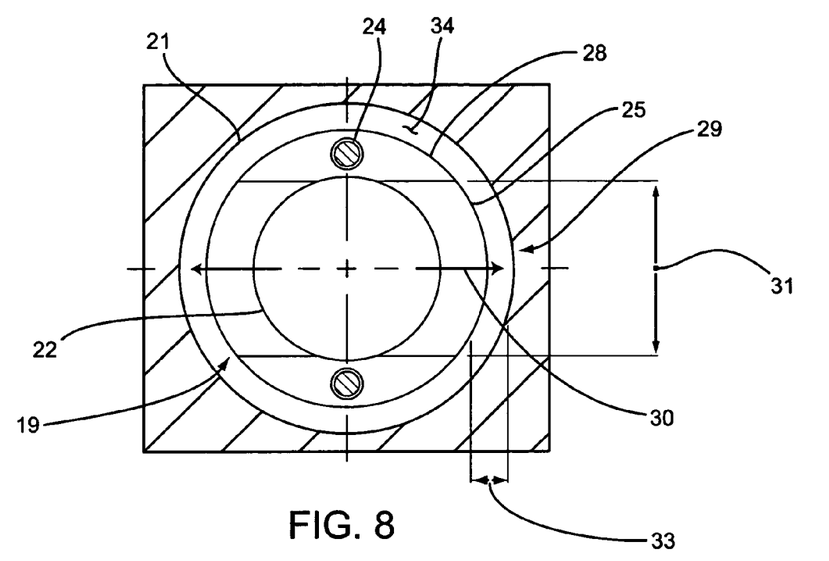
FIG. 8 is a further alternate sectional view along B—B of FIG. 2.

FIG. 8 provides a transverse section along line B—B of FIG. 2 showing yet another alternative embodiment of the laminar flow unit of the laminar flow assembly 19. The figure shows two somewhat crescent-shaped washers 28 on top of annular closed slice 25, equally spaced via two end plate screws 24. The open slice of the laminar flow unit is thus created by the two washers, which, when sandwiched between two adjacent closed slices, create two rectangular laminar flow channels 29, each having a width 31, b, an average length 33, L, and a transverse fluid velocity vector 30 flowing outwardly from the internal bore of the laminar flow assembly 22 to the exit channel 34 formed within the flow body bore 21.

Figure 9:
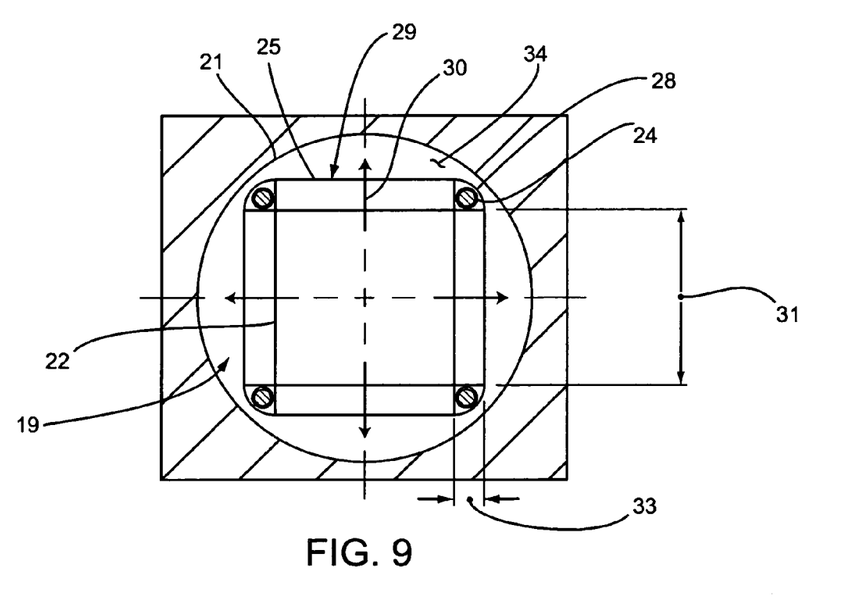
FIG. 9 is yet another sectional view along line B—B of FIG. 2.

FIG. 9 provides a transverse section through the flow body of the instruments, similar to section B—B of FIG. 2, showing an alternative embodiment of the laminar flow unit of the laminar flow assembly 19. FIG. 9 shows four substantially triangular-shaped washers 28, each with a rounded outer leg. The washers are equally spaced by means of four end plate screws 24 on top of a substantially square window-shaped closed slice 25. The open slice is defined by washers 28, which, when sandwiched between two adjacent closed slices, create four rectangular laminar flow channels 29, each having a width 31, b, a length 33, L, and a transverse fluid velocity vector 30 flowing outwardly from the internal bore of the laminar flow assembly 22 to the exit channel 34 formed within the flow body bore 21.

Figure 10:
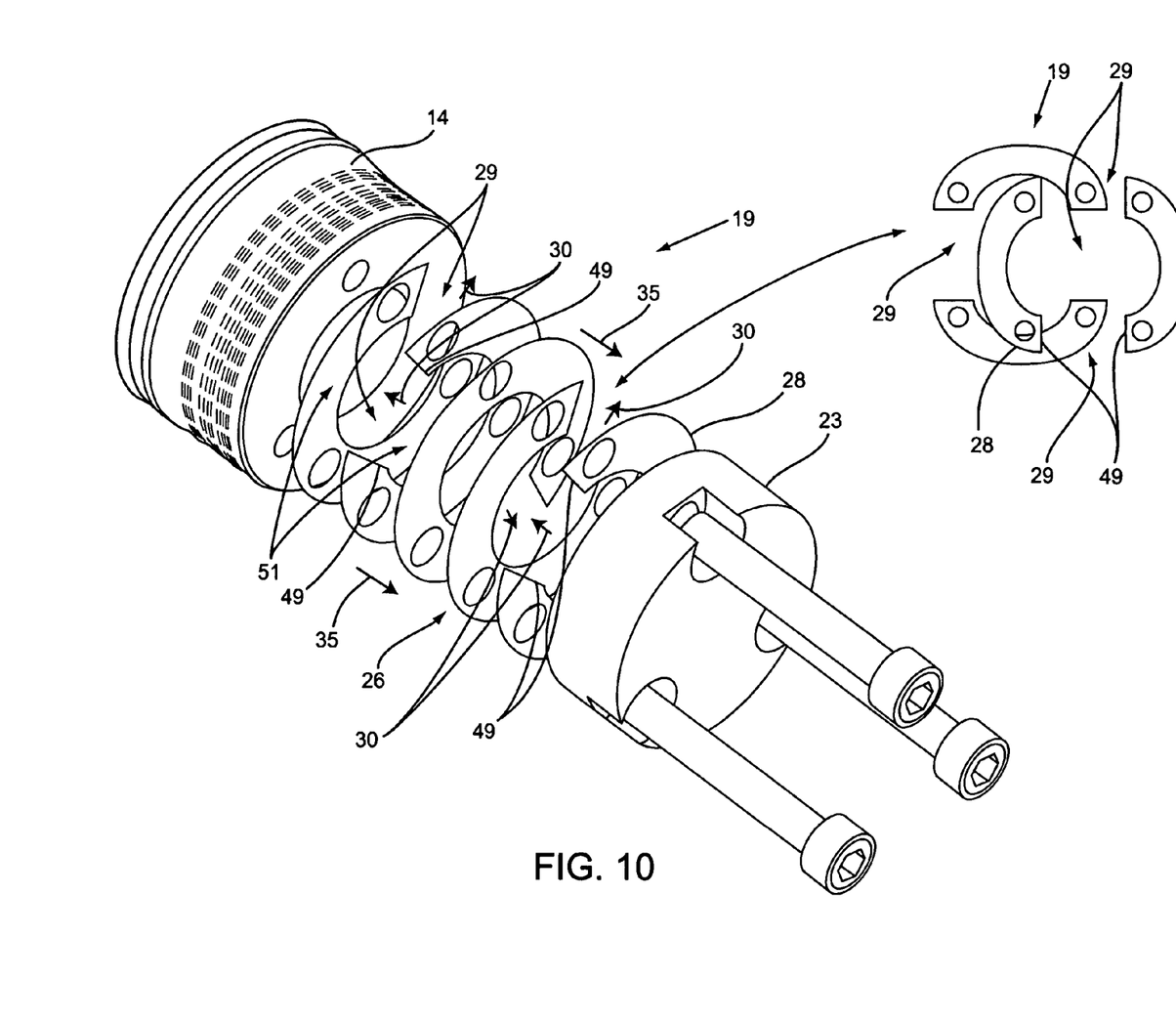
FIG. 10 is an exploded perspective view of a second major approach to assembly stack construction, together with an inset view of an alternate stack arrangement.

As for other possible variations of the subject invention, another approach to creating transverse flow channels in a flow assembly involves a stack of slices as shown in FIG. 10. Here, in a format similar to that of FIG. 3, FIG. 10 illustrates how one can (instead of using different types of slices to define transverse flow channels) use identical washers 28, providing open slices 26 that are stacked in an offset fashion so that upstream and downstream pieces provide opposing channel surfaces 51 to an intermediate piece that, itself, provides the sides 49 of a given channel. In the variation shown, each layer or slice of the subject assembly 19 includes a rectangular laminar flow channel 29 providing for a transverse fluid flow or velocity vector 30. These are shown offset by 60 degrees, utilizing the same compression/connection configuration shown in FIG. 2.

Of further interest, as above, other "slice" configurations are easily substituted within the assembly. In the case of the assembly view of the transverse flow body in FIG. 10, the layers resemble "C" sections. Instead, one might choose to use crescent or "("and")" shaped pieces 52 arranged in a 90 degree offset fashion to form one layer then the next. If such a substitution is made, then four compression bolts may provided in order to secure the structure. However assembled, such a system would offer certain advantages for high flow applications in that two laminar flow channels 29 would be provided in each slice or layer of the assembly, without resort to using differently-configured open and closed slices.

As such, it is to be appreciated that the alternative configurations of the laminar flow assembly shown the figures are presented as examples of the many variations thereof that could be constructed according to the principles of the present invention. Optional variations include different shapes and numbers of washers and end plate screws, as well as different shapes for the closed slices, flow body bore, flow nozzle, inlet filter, flow deflector, and other parts of the instruments in any combination. In one example, the end plate screws or bolts compressing the laminar flow assembly elements can be located outside of the assembly diameter (e.g., in the exit flow channels). By way of another example, the flow body bore can have a transverse cross section that is square or rectangular with a generally conforming shape of the laminar flow assembly, flow nozzle, and other parts of the instruments. Alternatively, the laminar flow assembly can be generally triangular in shape with a transverse cross section of the flow body bore that is either circular or triangular and with a flow nozzle with a transverse cross section that is either circular or triangular. Other polygonal or curved shapes for these parts can be similarly conceived. In any case, the contour of said flow nozzles can be conical, circular, elliptical, or any other shape facilitating at least a relatively smooth transition into the internal bore of the laminar flow assembly.

Yet, as previously described, it is advantageous according to one aspect of the invention that in any such variations that the cross-sectional flow areas at the inlet pressure port and the outlet pressure port are equalized in order to minimize dynamic pressure effects. Also, to maintain a smooth flow transition, it is advantageous that both may additionally be equal to the internal cross-sectional flow area of the laminar flow assembly. However, each such consideration need only be observed according to certain aspects of the invention, others offer their own independent application and/or utility.

As for any further constructional features or details regarding aspects of the subject invention not already mentioned, such considerations should be regarded as with the ability of those with ordinary skill in the art to determine. In addition, those with skill in the art may appreciate various modifications, refinements or improvements that fall within the general scope of the present invention. Further, one may appreciate a means or manner that is presently known or later-developed which is not disclosed herein, but that satisfies the purpose of function of a given element or item. It is the intent that any related disclosure of subject matter herein be viewed as generic thereto in support of the present invention. In other words, though the invention has been described in reference to several examples, optionally incorporating various features, the invention is not to be limited to that which is described or indicated as contemplated with respect to each embodiment or variation of the invention. It has been the intent of the drafter hereof to impart an accurate and inclusive understanding of the invention, but without unnecessarily burdening the reader with exhaustive, even obvious, illustration.

EXAMPLE

Figure 11:
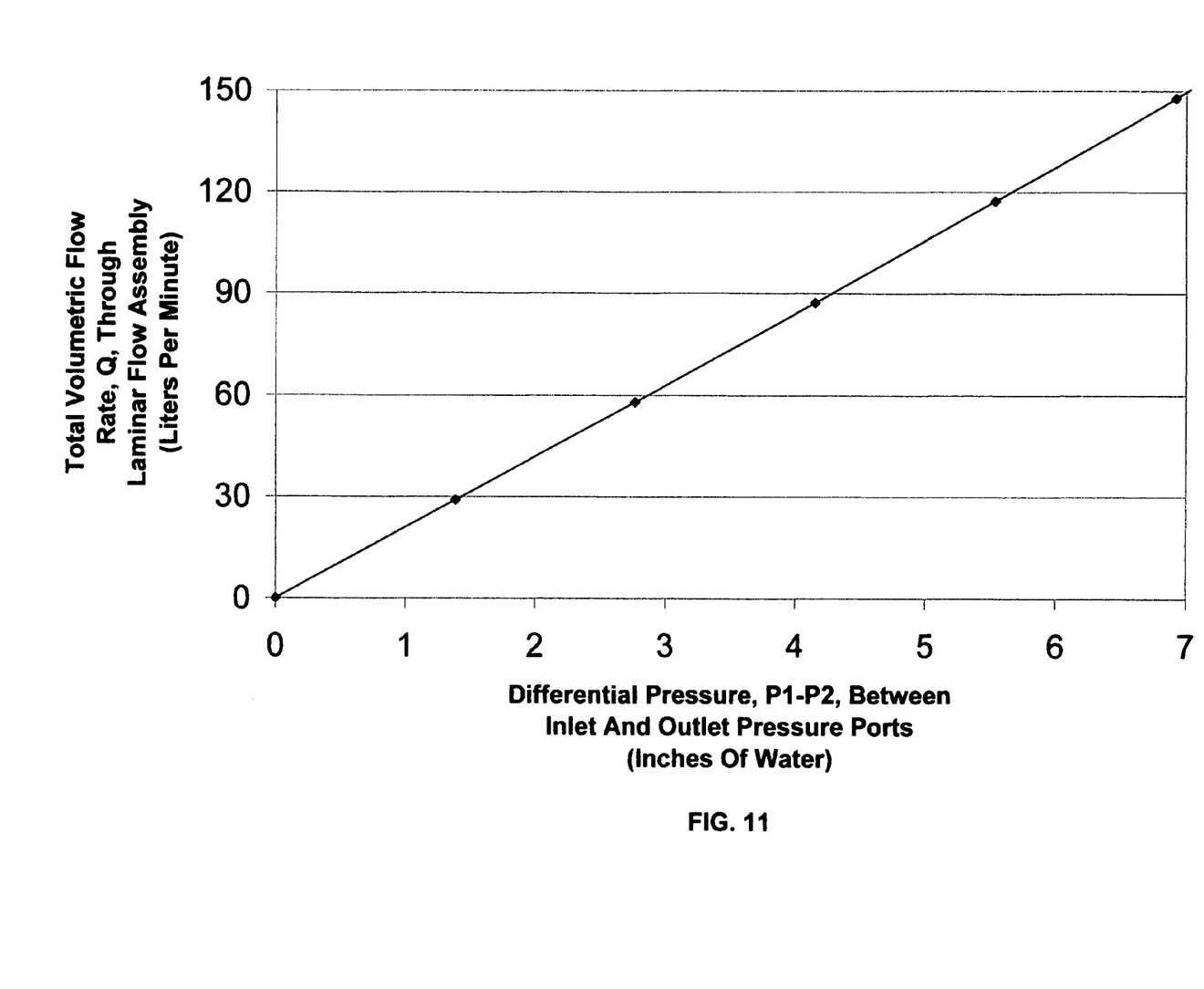
FIG. 11 is a graph of volumetric flow rate (Q) versus pressure drop ($P_1-P_2$) for a mass flow controller according to FIG. 2.

As for the performance of the subject devices, FIG. 11 demonstrates a nearly linear relationship between the total flow rate, Q, and the pressure drop, $P_1-P_2$, for the embodiment of the mass flow controller and element stack shown in FIGS. 2 and 3. Comparable performance should be manifested in other configurations built according to the same principles.

The data shown in FIG. 11 is for air at 20 degrees centigrade and one atmosphere pressure. The subject laminar flow assembly was constructed with an internal diameter of 0.626 inches, an external diameter of 1.110 inches in a flow body with an internal bore diameter of 1.275 inches. Each closed slice had a thickness of 0.006. Open slices were provided that defined three rectangular laminar flow channels, each with a height, a, of 0.0030±0.0002 inches, a width, b, of 0.542±0.005 inches, and an average length, L, of 0.265 inches. The flow areas $A_1$ and $A_2$ of the bore of the laminar flow assembly and the annular exit channel are 0.308 and 0.309 square inches, respectively, and were thus essentially equal.

For flow rates from 0% to 100% of the full-scale flow rate of 150 liters per minute, the Q vs $P_1-P_2$ curve shown in FIG. 8 is linear within about 1% of full scale. Indeed, this is the case without the use of any linearizing electronics at all. As such, the Q vs $P_1-P_2$ curve in FIG. 8 exhibits negligible dynamic pressure ($\rho Q^2$) effects, thereby demonstrating performance improvements over known devices.

The breadth of the present invention is to be limited only to the broadest possible scope of the following claims, which claims are to be interpreted given the plain meaning of terms, modified only to account for any explicit definition of terms herein or relied upon during prosecution.

We claim:

1. A transverse flow laminar flow assembly comprising: a plurality of layers of sheet stock;
the layers forming an internal flow channel along an axis;
the layers forming a plurality of assembly output flow channels transverse to the axis and dimensioned for substantially laminar flow of a fluid therethrough, opposing surfaces of two layers providing top and bottom portions of an output flow channel, and sides of the output flow channel provided by potions of an open intermediate layer in the form of a single piece or a plurality of pieces between the two layers.

2. The assembly of claim 1, wherein the sides of the output flow channel are substantially parallel.

3. The assembly of claim 1, wherein the assembly comprises a cylindrical outer surface and the internal flow channel is in the form of a cylindrical bore.

4. The assembly of claim 1, wherein the layers are stacked in an offset manner.

5. The assembly of claim 4, wherein the layers are identically shaped.

6. The assembly of claim 1, wherein only one output flow channel is provided through the intermediate layer.

7. The assembly of claim 1, wherein at least the intermediate layer has a thickness of between about 0.001 and about 0.050 inches.

8. The assembly of claim 7, wherein each layer has a thickness of between about 0.001 and about 0.050 inches.

9. The assembly of claim 1, wherein at least one output flow channel is provided by each layer.

10. The assembly of claim 1, wherein the sheet stock comprises metal shim stock.

11. The assembly of claim 1, wherein bolts secure the layers between a nozzle converging to the internal flow channel on one end and an end plate covering another end of the internal flow channel.

12. A flow meter comprising:
a body comprising a bypass capillary tube for a minority fraction of flow through the meter; and
an assembly according to claim 1, wherein the internal flow channel of the assembly is for a majority fraction of flow.

13. The flow meter of claim 12, wherein the flow meter is configured as a volumetric flow meter.

14. The flow meter of claim 12, wherein the flow meter is configured as a mass flow meter.

15. A flow controller, comprising:
a flow meter according to claim 12; and
a flow control valve.

16. A transverse flow laminar flow device comprising:
a transverse flow assembly comprising an axial internal flow entry conduit and a plurality of flow exit conduits adapted to output flow in a direction transverse to the axis,
a nozzle smoothly transitioning from a larger diameter of an inlet to the axial internal entry conduit, to a smaller diameter of the axial internal entry conduit.

17. The device of claim 16, wherein the larger diameter is provided within a body of the device, following a smaller diameter inlet process connection.

18. The device of claim 16, further comprising a flow deflector body positioned within the larger diameter to divert flow from an axial direction.

19. The device of claim 16, further comprising a filter adjacent to an inlet of the nozzle.

20. A transverse flow laminar flow device comprising:
a transverse-flow assembly comprising an axial internal flow entry conduit and a plurality of flow exit conduits adapted to direct output flow transverse to the axial internal flow entry conduit, and
a flow deflector supported by a hub and positioned between an inlet process connection of the device and the axial interior flow entry conduit, the flow deflector and hub adapted to direct flow radially between the inlet process connection and the axial interior flow entry conduit.

21. The device of claim 20, further comprising a converging nozzle between the flow deflector and the internal flow entry conduit.

22. The device of claim 20, further comprising a filter between the flow deflector and the internal flow entry conduit.

23. The device of claim 20, further comprising a converging nozzle between the filter and the internal flow entry conduit.

24. The device of claim 16 or 20, further comprising:
a transverse flow laminar flow assembly comprising a plurality of layers of sheet stock; the layers forming an internal flow channel alone an axis; the layers forming a plurality of assembly output flow channels transverse to the axis and dimensioned for substantially laminar flow of a fluid therethrough, opposing surfaces of two layers providing top and bottom portions of an output flow channel, and sides of the output flow channel provided by potions of an open intermediate layer in the form of a single piece or a plurality of pieces between the two layers.

* * * * *